Jan. 14, 1936.     A. W. ARNOLD     2,027,760
DISPENSING CONTAINER
Original Filed Aug. 31, 1933

Albert W. Arnold, Inventor
By Vernon E. Hodges
  His Attorney

Patented Jan. 14, 1936

2,027,760

UNITED STATES PATENT OFFICE 2,027,760

DISPENSING CONTAINER

Albert W. Arnold, Miami, Fla.

Application August 31, 1933, Serial No. 687,711
Renewed June 11, 1935

8 Claims. (Cl. 221—47.1)

This invention relates to an improvement in dispensing containers of the character set forth in my application on Lubricating apparatus, Serial No. 641,065, filed November 3, 1932.

In using heavy grease in a container for a grease-gun or other lubricating apparatus, it is necessary to force the grease down into the base where it is to be extruded, using some means for applying pressure to the top surface of the grease, which means is ordinarily fluid pressure.

Where air pressure is used, a line of least resistance will be followed by the grease so that an inverted cone will be formed in the top surface of the grease in the container, but eventually this will reach down into the base where the grease is extruded with the result that the air pressure will pass through the extruding chamber instead of forcing the grease therethrough, which is undesirable.

The object of my invention is to provide equalizing distribution of grease at the discharge opening of the container so that its flow will be uniform, and the fluid pressure will force the grease down in the container without forming the inverted cone in the surface thereof. For this reason, thick heavy grease may be used with my invention in containers of this character, which it has not been practical to use heretofore.

My invention contemplates the placing of a distributing disk in the lower portion of the container, spaced slightly above the discharge orifice thereof, so as not to close said orifice and cut off the discharge, which distributing disk has openings arranged therearound through which the grease passes to reach the discharge orifice for distributing the discharge from the main portion of the container approximately throughout the area thereof. It is possible by using this distributing disk in the bottom of the container so completely to distribute the direction of flow of the grease through the orifice of the container that substantial air pressures fail to penetrate the grease and uniform discharge of approximately all of the grease in the container is obtained.

Figure 1:
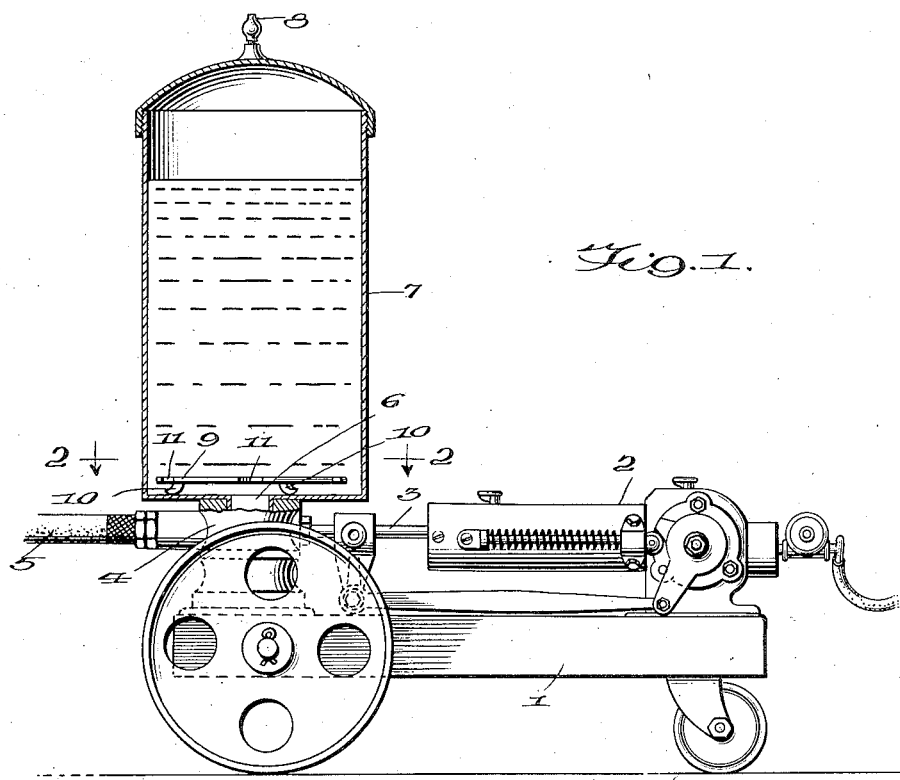
Figure 2:
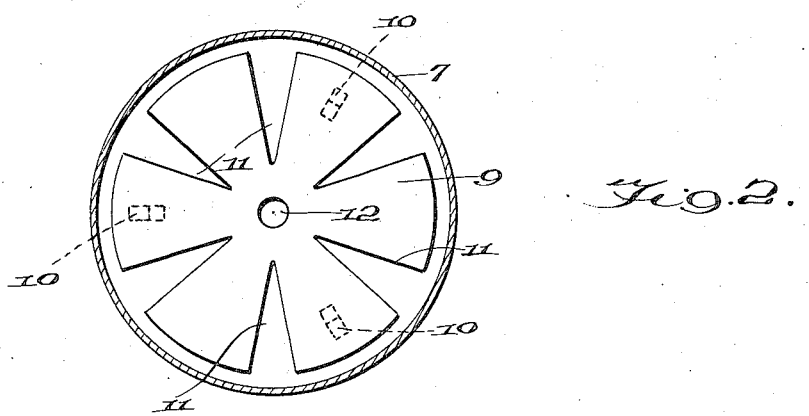

In the accompanying drawing:

Fig. 1 is a side elevation of the lubricating apparatus, showing the container in section, and having my distributing disk applied thereto; and Fig. 2 is a horizontal sectional view on the line 2—2 of Fig. 1, showing the disk in plan.

The lubricating apparatus to which this invention is shown as applied is that set forth in my prior application Serial No. 641,065, filed November 3, 1932, to which reference is made for complete description and illustration of the lubricating apparatus, and only a general illustration and description is given here sufficient for an understanding of the application of my distributing disk to the lubricant-container thereof.

The lubricating apparatus comprises a carriage 1 on which is mounted a fluid motor 2 having a plunger 3 operating through a base 4 for forcing lubricant therefrom through a hose 5 or other tubular connection for directing the lubricant to the point desired. The plunger 3 reciprocates within the base 4, and each stroke thereof forces a charge of lubricant from the base.

The lubricant is drawn into the base through an orifice 6 in the bottom of a lubricant container 7 which is securely fastened to the top of the base. The container 7 is shown as having a controlled air supply connection 8 in the top thereof, adapted to be connected with an air line or other source of fluid supply for applying fluid pressure within the top of the lubricant container 7.

A distributing disk 9 is disposed in the bottom of the container 7, and has supporting feet 10 for supporting it within said container, which feet rest on the bottom of the container, in the form shown.

The disk 9 has a plurality of peripheral notches 11 therein and a central opening 12, which notches and central opening so distribute the discharge of lubricant from the container in its passage to the discharge orifice 6 as to provide a uniform flow of lubricant approximately throughout the area of the container as said lubricant is forced down by the fluid pressure thereon.

The use of the distributing disk in the container eliminates the formation of an opening through the grease by fluid pressure and obtains a complete discharge of the grease uniformly from the container. It has been found from actual use of the invention that air pressures as high as one hundred and seventy-five pounds or more have failed to penetrate the grease, although without the distributing disk such pressure would ordinarily form an opening through the grease in the container and prevent the complete discharge thereof uniformly.

My distributing disk may be used in any kind of gun or dispensing container, as desired, and is not limited to the lubricating apparatus illustrated and described.

I claim:

1. A grease container having a discharge orifice therein, and a distributing disk extending approximately throughout the area of said container and mounted over said orifice in spaced relation therefrom and having openings of gradually diminishing size from the outer portion of the disk toward the center thereof and arranged therein over a substantial portion of the area thereof, through which the grease passes to the discharge orifice.

2. A grease container having a discharge orifice in the bottom thereof, and a distributing disk extending approximately throughout the area of said container and mounted in said container in spaced relation above said discharge orifice and approximately covering said orifice, said disk having a plurality of openings therethrough of gradually diminishing size from the outer portion of the disk toward the center thereof and arranged over a substantial portion of the area of said disk to equalize the flow of lubricant to the discharge orifice.

3. In a grease container having a discharge orifice, a distributing disk arranged over the orifice and extending approximately throughout the area of the container, said disk having a plurality of radially-arranged approximately V-shaped openings therein for equalizing the distribution of grease passing to said orifice.

4. In a grease container having a discharge orifice, a distributing disk arranged over the orifice and extending approximately throughout the area of the container, said disk having a plurality of radially-arranged approximately V-shaped notches in the periphery thereof for equalizing the distribution of grease passing to said orifice, said disk having a relatively small central opening, and feet arranged under the disk for supporting the same in the container.

5. In lubricating apparatus, a grease container having a discharge orifice in the bottom thereof and adapted to contain a body of grease above said discharge orifice, means for applying fluid pressure to the top surface of said body of grease to force said grease through the orifice, and a distributing disk extending approximately throughout the area of the container and arranged over the discharge orifice, said disk having openings of gradually diminishing size from the outer portion of the disk toward the center thereof and distributed therein to equalize the distribution of the grease passing to the discharge orifice.

6. In a pressure grease container having a discharge opening in the bottom thereof for discharge of grease therethrough by fluid pressure, a distributing disk extending approximately throughout the area of the container and spaced above the bottom over the discharge opening, said disk having openings therethrough of gradually diminishing size from the outer portion of the disk toward the center thereof and so arranged throughout a substantial portion of the area of said disk as to equalize the distribution of grease forced by the pressure to the discharge opening.

7. In a pressure grease container having a discharge opening in the bottom thereof for discharge of grease therethrough by fluid pressure, a distributing disk in said container over the discharge opening and extending approximately throughout the area of the container, said disk approximately covering over the top of the discharge opening and spaced therefrom with openings of gradually diminishing size from the outer portion of the disk toward the center thereof and terminating in radially spaced relation outside of the periphery of the discharge opening, said openings in the disk being so arranged as to equalize the distribution of grease forced by fluid pressure to the discharge opening.

8. In a device of the character described, a tank or container having an outlet in the region of the lower end through which its contents is discharged, and a partition located above the outlet and provided with discharge openings, the size of each of which increases with its distance from the main discharge outlet.

ALBERT W. ARNOLD.